(12) United States Patent
Teramachi et al.

(10) Patent No.: US 6,168,711 B1
(45) Date of Patent: Jan. 2, 2001

(54) WATER SUPPLY AND DRAINAGE TYPE MICROORGANIC DEODORIZING SYSTEM

(75) Inventors: Masayoshi Teramachi; Ryouzo Matsumoto, both of Nagoya (JP)

(73) Assignee: Touyoudainamu Co., Ltd., Aichi-ken (JP)

(*) Notice: Under 35 U.S.C. 154(b), the term of this patent shall be extended for 0 days.

(21) Appl. No.: 09/302,732

(22) Filed: Apr. 30, 1999

(30) Foreign Application Priority Data

Apr. 30, 1998 (JP) .................................................. 10-137499

(51) Int. Cl.[7] .................................................. B01D 53/02
(52) U.S. Cl. .............................. 210/123; 96/109; 96/122; 96/135; 210/151; 435/266; 435/294.1; 435/297.1
(58) Field of Search .................................. 210/123, 188, 210/194, 257.1, 263, 610, 916, 266; 96/121, 122, 290, 109, 135, 157; 95/187, 211, 223, 224, 141; 435/262, 266, 294.1, 297.1

(56) References Cited

U.S. PATENT DOCUMENTS

| | | | |
|---|---|---|---|
| 4,225,381 | * 9/1980 | Ishikawa et al. | 435/266 |
| 4,723,968 | * 2/1988 | Shippert et al. | 435/266 |
| 4,806,148 | * 2/1989 | Ottengraf | 435/266 |
| 5,409,834 | * 4/1995 | Birdwell . | |
| 5,518,920 | * 5/1996 | Stewart et al. | 435/266 |
| 5,586,995 | * 12/1996 | Vollhardt et al. | 96/290 |
| 5,635,394 | * 6/1997 | Horn | 436/266 |
| 5,656,494 | * 8/1997 | Kant et al. | 435/294.1 |
| 5,676,836 | * 10/1997 | Yamaski et al. | 210/916 |
| 5,891,711 | * 4/1999 | Carter | 435/266 |
| 6,019,817 | * 2/2000 | Seagle | 96/135 |
| 6,069,004 | * 5/2000 | Teramachi et al. | 435/294.1 |

FOREIGN PATENT DOCUMENTS

282750 * 9/1988 (EP) .
WO 94/23825 * 10/1994 (WO) .

* cited by examiner

*Primary Examiner*—Joseph W. Drodge
(74) *Attorney, Agent, or Firm*—Flynn, Thiel, Boutell & Tanis, P.C.

(57) ABSTRACT

The invention relates to a water supply and drainage type microorganic deodorizing system, by which a clogging of deodorizer can be effectively prevented in order to decrease a deodorizing capacity, wherein deodorization chambers are provided in two stages in the tower main body, offensive odor constituents are gradually adsorbed by filters of the deodorization chambers as ordered by decomposing action of microorganisms, and decomposed in order to completely deodorize. Furthermore, by providing a water sprinkling system of replenishing water in relation to the filters the performance of the filters can be restored, and furthermore, by providing a water diluting system WC which dilutes cleansing water of the filters, drainage can be prevented from being contaminated, in accordance with drainage standards.

16 Claims, 6 Drawing Sheets

WATER SUPPLY AND DRAINAGE TYPE MICROORGANIC DEODORIZING SYSTEM

BACKGROUND OF THE INVENTION

1. Field of the Invention

The invention relates to a water supply and drainage type microorganic deodorizing system for decomposing offensive odor constituents of exhaust gas through the agency of microorganisms.

2. Description of the Related Art

With a well known deodorizing system a of this type as shown in FIG. 6, exhaust gas g containing offensive odor constituents is fed below a deodorizing layer c of a tower main body b, filled with activated charcoal as a deodorizing agent, water soluble offensive odor constituents are removed from the exhaust gas g by showering thereon with process water w supplied via a water supply system wr from a water reservoir d, installed at the bottom of the tower main body b, into which process water is replenished as necessary, and the exhaust gas subjected to a primary treatment is passed through the deodorizing layer c for deodorization.

However, in the deodorizing system a of this type, since water soluble offensive odor constituents are removed simply by showering with process water w in the form of droplets on the exhaust gas g, water insoluble offensive odor constituents, which have not been removed, will ascend in the tower main body b, reaching the activated charcoal in the deodorizing layer c.

While the water insoluble offensive odor constituents are adsorbed to pores of the activated charcoal, and the exhaust gas g is deodorized and emitted into the atmosphere, clogging of numerous pores of the activated charcoal occurs due to adsorption of the water insoluble offensive odor constituents to the pores with the result that the functions of the activated charcoal for adsorption and deodorization are degraded. Consequently, the deodorizing system described above has a drawback of requiring periodic replacement of the activated charcoal.

Furthermore, although the activated charcoal has strength in of adsorbing and holding methanethiol, sulfur compounds such as methyl sulfide and the like, alcohol, fatty acids, hydrocarbon halide, aliphatic hydrocarbon, aromatic hydrocarbon, ester, and the like, it hardly adsorbs formic acid having one carbon atom, formaldehyde methyl alcohol, propane, methyl chloride, and the like while it has little strength in adsorbing ammonia, hydrogen sulfide, etc.

Consequently, the system has had a drawback that sufficient deodorization of exhaust gas containing various offensive odor constituents could not be achieved because it had been difficult for parts of the offensive odor constituents to be adsorbed to the activated charcoal even if other parts thereof could be adsorbed.

SUMMARY OF THE INVENTION

It is therefore an object of the invention to provide a water supply and drainage type microorganic deodorizing system capable of achieving sufficient deodorization of various offensive odor constituents of exhaust gas, maintaining excellent deodorizing capacity thereof by preventing degradation in adsorptive capacity of a deodorizing agent due to clogging thereof.

In light of the problems encountered in the case of conventional deodorizing systems such as clogging of a deodorizing agent, degradation in the adsorptive capacity thereof, and difficulty with removal of some types of offensive odor constituents, the invention provides a water supply and drainage type microorganic deodorizing system, wherein two staged deodorization chambers are provided in a tower main body, each chamber having a different absorbing agent filled therein, and an exhaust gas inflow duct is secured at the lower part of a lower deodorization chamber, whereby after offensive odor constituents are gradually absorbed by absorbing agents and microorganisms in the lower and upper deodorization chambers, the offensive odor constituents are deodorized by decomposition and treatment.

DESCRIPTION OF THE PREFERRED EMBODIMENTS

Hereinafter, a description is given of a preferred embodiment of a water supply and drainage type microorganic deodorizing system according to the invention with reference to the accompanying drawings.

Figure 1:
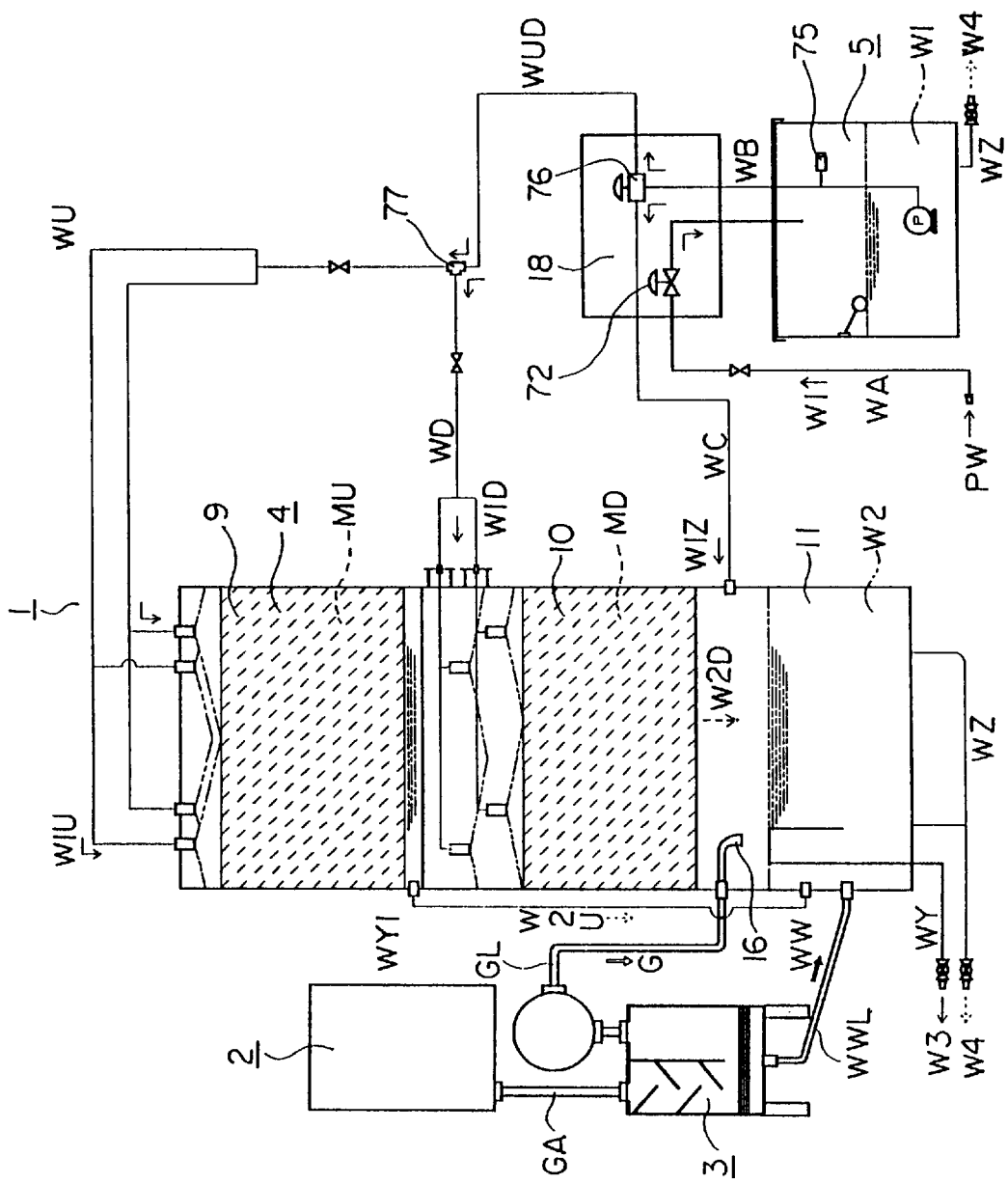
FIG. 1 is an exemplary view of a deodorizing system according to the invention.

As shown in FIG. 1, the water supply and drainage type microorganic deodorizing system 1 according to the preferred embodiment of the invention is linked with a dust collector 3 connected to an exhaust gas generating source 2, and a deodorizing system 1 comprises a deodorization tower 4 and a water reservoir tank 5.

And, a fermentation treatment unit for recycling organic waste is cited as an example of the exhaust gas generation source 2, and in such a fermentation treatment unit, a bio-fermentation process is applied to organic waste such as kitchen refuse sludge, animal refuse, and the like for resource recycling as organic fertilizer, soil conditioner, etc.

Figure 2:
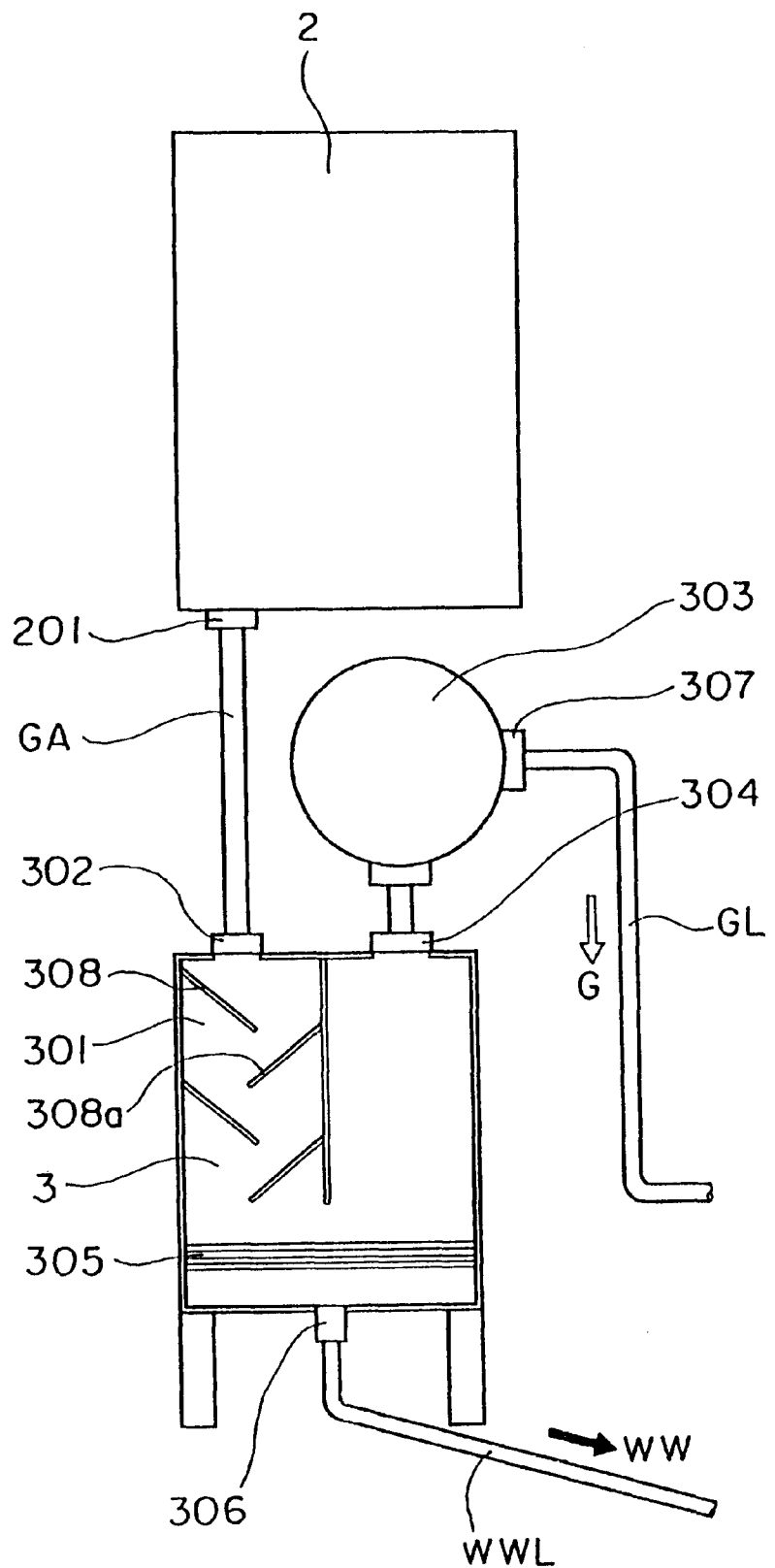
FIG. 2 is an exemplary sectional view of a dust collector.

Furthermore, as shown in FIG. 2, a suction inlet port 302 of an exhaust gas G is provided at the upstream side of a dust collector chamber 301 as an example of the dust collector 3, and at the same time an absorbing port 304 of a blower 303 is secured at the downstream side thereof. Still furthermore, a filter 305 such as an SS mat, a mesh filter, etc., which eliminates SS (smut) is provided at the lower part of the dust collector chamber 301 while an outflow port 306 of a mist (drain water) WW contained the exhaust gas G is provided further downstream thereof.

An exhaust port 201 of the exhaust gas G of the exhaust gas generating source 2 is linked with the suction inlet port 302 of the dust collector 3 by an exhaust gas flow system GA, and the exhaust gas supply system GL connected to a discharge port 307 of the blower 303 in the dust collector is connected to a deodorizing tower 4 in the deodorizing system 1. A mist streaming system WWL which is connected to the outflow port 306 in the dust collector 3 is further connected to the deodorizing tower 4.

A dust collecting chamber 301 of the dust collector 3 is such that a plurality of interruption plates 308, 308a, ... inclined in the circulating direction of the exhaust gas G are installed with the installation stages unevenly changed and in different directions from both sides to the center in the dust collecting chamber 301.

Furthermore, although the blower 303 which supplies the exhaust gas G is provided in the dust collector 3, the blower 303 may be installed in the exhaust gas generating source 2, deodorizing system 1, or exhaust gas supply system GL other than the dust collector 3, or the dust collecting system of the dust collector 3 may be subjected to various modifications. Furthermore, in a case where dust is minimal in the exhaust gas G generated at the exhaust gas generating source 2, the dust collector 3 may be omitted, wherein the exhaust gas generating source 2 may be directly connected to the deodorizing system 1.

Figure 3:
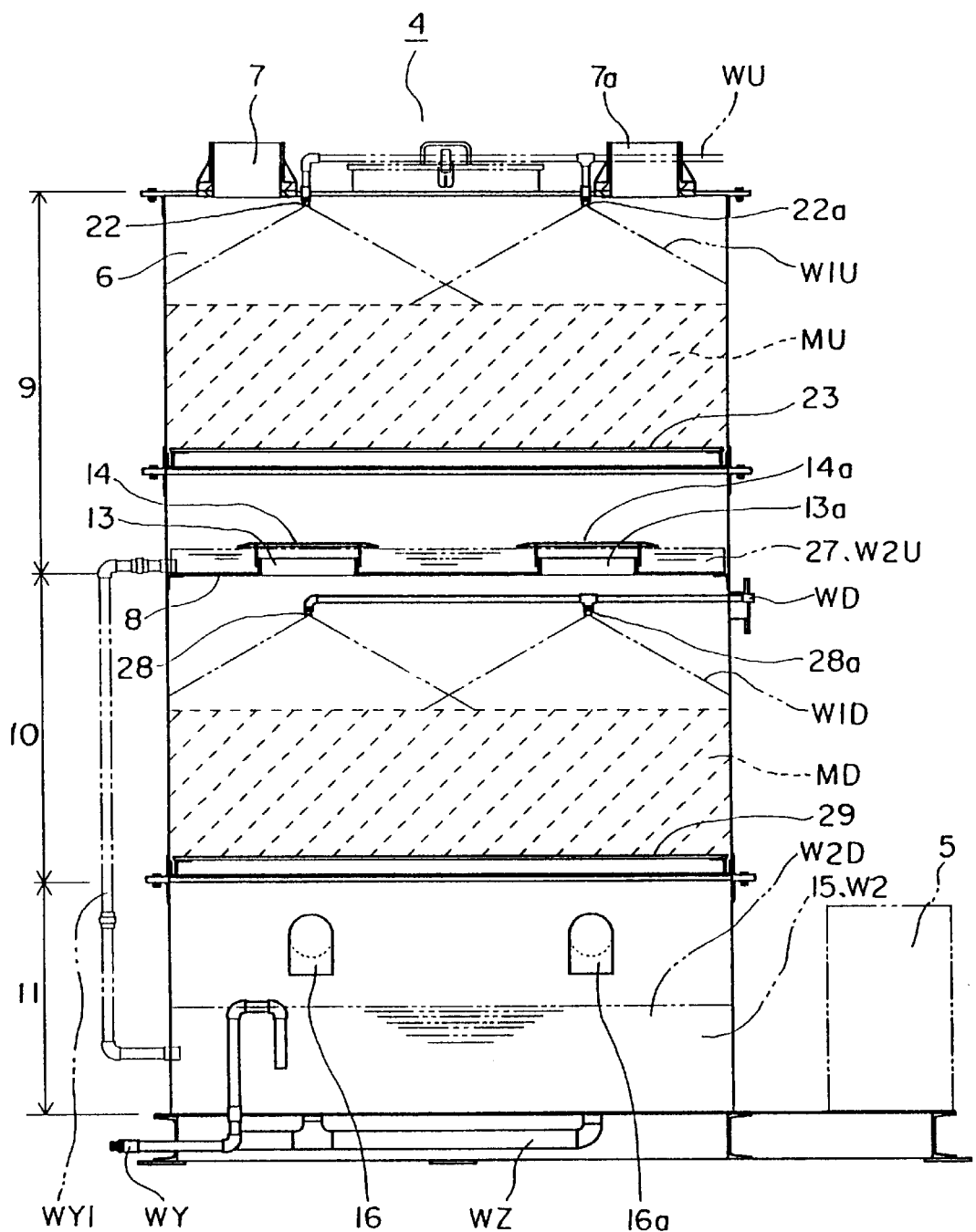
FIG. 3 is a rough sketch of a longitudinally sectional view of a deodorizing tank.
Figure 4:
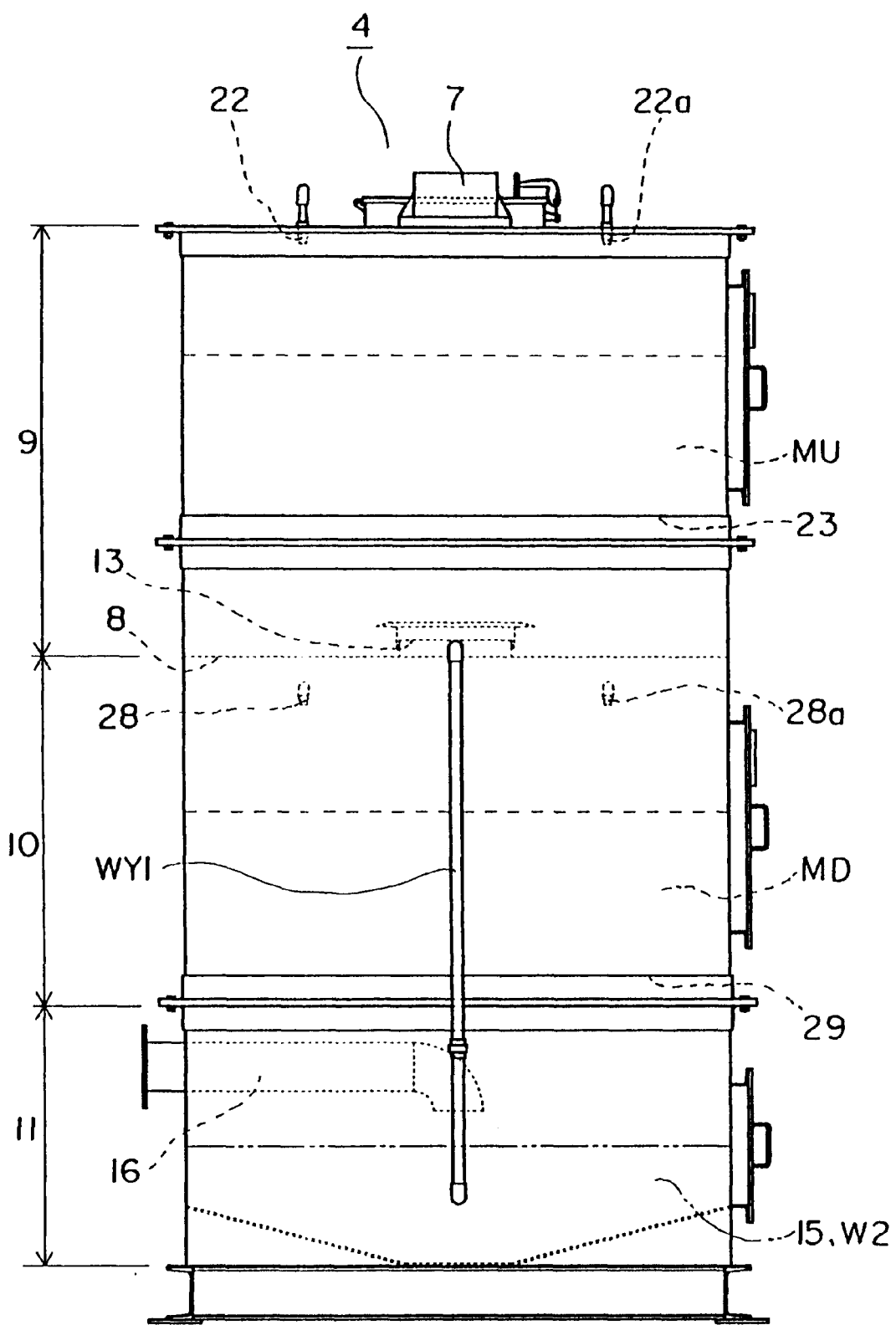
FIG. 4 is a side elevational view of FIG. 3.

As shown in FIGS. 3 and 4, the deodorization tower 4 is provided with exhaust outlets 7 and 7a disposed on the top end of a tower main body 6 set upright and formed in a cylindrical shape with a. A horizontal partitioning wall 8 is provided in the inner space of the tower main body 6. The interior of the tower main body 6 is divided into an upper deodorization chamber 9 and a lower deodorization chamber 10.

And, a mist collector (not illustrated) is internally provided in the exhaust outlets 7 and 7a secured at the upper end of the tower main body 6.

As an example of a mist collector, it may have a structure made up of multi-layered nets composed of fine wire meshes, and the like so as to cause the flow path of passing gas to become complex.

Operation of the mist collector is as follows. As opposed to gas freely passing through between the wire meshes, mist WW which is heavier than gas is unable to change the flow path thereof owing freely to the effect of inertia thereof, and moves off the flow path of gas, coming into contact with the wire meshes. Mist WW in contact with the wire meshes is adhered thereto owing to surface tension, and aggregated into larger particles, finally growing in size large enough to surpass updraft and surface tension while descending along the wire meshes, so as to come down in the form of droplets.

Furthermore, a deodorizer (not illustrated) filled up with activated charcoal in a gas-permeable state may be linked with the exhaust outlets 7 and 7a, wherein the mist collector is installed.

With such a construction, the exhaust gas G deodorized through a deodorizing operation described hereinafter is emitted into the atmosphere through the deodorizer in the last stage of operation.

Activated charcoal tends to have its adsorptive capacity thereof deteriorated when mist WW (moisture) is adsorbed thereto.

Link-ups 13 and 13a, in a tubular form, are installed upright on the horizontal partition wall 8 for linking an upper deodorization chamber 9 with a lower deodorization chamber 10. Covers 14 and 14a are installed on the upper end of the link-ups 13 and 13a in such a way as to secure flow paths of gas.

With such a construction, at the time of sprinkling water in the upper deodorization chamber 9 described below, liquid is prevented from making a direct ingress into the link-ups 13 and 13a.

Further, as shown in FIGS. 1, 3, and 4, an air and water permeable partition plate 23 such as a punched plate or the like is installed at the lower intermediate level of the upper deodorization chamber 9, in order to fill up with a substance having an adsorbing characteristic, for example, an upper level filter MU composed of an adsorptive matter. And the upper level filter MU is filled up on the corresponding partition plate 23.

An area which is lower than the upper ends of the link-ups 13 and 13a protruding upward from the horizontal partitioning wall 8, which partitions the lower deodorization chamber 10, downward of the partition plate 23, is made into an upper water receiving section 27 of process water W2U.

Furthermore, spraying heads 22, 22a, . . . which sprinkle replenishing water W1U are disposed at the upper part of the upper deodorization chamber 9.

As shown in FIGS. 1, 3, and 4, the major construction of the lower deodorization chamber 10, which is lower than the horizontal partition wall 8, is roughly the same as that of the upper deodorization chamber 9, except that the type of adsorbing agent is different for each one (whereby the component names and reference numbers are different). An air and water permeable partition plate 29 is provided at the intermediate part downward of the lower deodorization chamber 10 in the tower main body 6, and a lower level filter MD made of an adsorbent having an adsorbing characteristic is placed on the corresponding partition plate 29.

Furthermore, spraying heads 28, 28a, . . . which sprinkle replenishing water W1D downward in a mist state are disposed at the upper part of the lower deodorization chamber 10.

As shown in FIGS. 1, 3 and 4, the lower part of the partition plate 29 in the lower deodorization chamber 10 is made into a lower processing chamber 11, and at the same time a process water reservoir 15 of mixed process water W2 (which will be discharge water W3 consisting of process water W2U, W2D and replenishing water W1Z) is provided at the lower part of the corresponding lower processing chamber 11.

Exhaust gas inducing ducts 16 and 16a for inducing exhaust gas G from the exhaust gas generating source 2 and dust collector 3 into the interior of the lower deodorization chamber 10 of the deodorization system 1 are disposed so as to penetrate the side wall of the lower processing chamber 11, thereby constituting an exhaust gas supply system GL of the exhaust gas G from the exhaust gas generating source 2.

Furthermore, the exhaust gas inducing ducts 16 and 16a are disposed in a space of the lower processing chamber 11 having a process water reservoir 15. However, if the exhaust gas inducing ducts 16 and 16a are provided downward of the lower deodorization chamber 10, the construction of the lower deodorization chamber 10, lower processing chamber 11 and exhaust gas inducing ducts 16 and 16a is not limited to the example according to the preferred embodiment.

By inclining the bottom of the process water reservoir 15, all liquid can be discharged, as shown in FIG. 4, when the operation is stopped.

Furthermore, replenishing water W1U sprinkled by the spraying heads 22, 22a, . . . in the upper deodorization chamber 9 cleanses the upper level filter MU, passes through the upper partition plate 23 and falls down. And, a discharge system WY1 which causes the process water W2U reaching an upper water receiving portion 27 to flow out is disposed, and the downstream side thereof is connected to the process water reservoir 15 of the lower processing chamber 11.

Replenishing water W1D sprinkled by the spraying heads 28, 28a, . . . in the lower deodorization chamber 10 cleanses the lower level filter MD, passes through the lower partition plate 29 and falls down. Then, the replenishing water W1D becomes process water W2D and directly flows into the process water reservoir 15.

Furthermore, a mist streaming system WWL of the dust collector 3 is connected to the process water reservoir 15 of the lower processing chamber 11.

An overflow pipe is provided in the process water reservoir 15 in order to maintain the water volume of discharge water W3 (mixed water of mixed process water W2 and replenishing water W1) in the process water reservoir 15 and simultaneously to discharge diluted discharge water W3.

It is better that the downstream end of the discharge system WY1 which causes the process water W2U, used for cleansing, to drop, is made open in the mixed process water W2

The reason exists in that even though the exhaust gas G flown from the exhaust gas generating source 2 into the lower deodorization chamber 10 (lower processing chamber 11) is ascending toward the lower deodorization chamber 10 and upper deodorization chamber 9 while accompanying a pressure loss, the exhaust gas G in the upper deodorization chamber 9 and lower deodorization chamber 10 is in a state where pressure is applied.

Furthermore, another reason exists in that, since the replenishing water W1U is not always sprinkled, the interior of the drain water pipe is not watertight due to process water W2U dropping in the discharge system WY1, and there is a fear that the exhaust gas G in the lower processing chamber 11 ascends or the exhaust gas G in the upper deodorization chamber 9 flows out from the discharge system WY1.

The upper level filter MU composed of adsorbents filled up in the upper deodorization chamber 9 is made by mixing soil accumulated on a weathered sedimentary layer of volcanic extrusion such as Kuroboku soil, pulverized earth and sand, volcanic ash, and the like with "roasted" charcoal produced by the destructive distillation of rice hulls in a covered vessel, and subsequently, by granulating a mixture after adding a binder thereto.

The roasted charcoal is an adsorptive and porous substance or matter in an intermediate state between activated charcoal and natural organic substances or matter, containing effective constituents to serve as sources of nutrition supply for microorganisms.

The lower level filter MD filled in the lower deodorization chamber 10 and composed of adsorbents is a porous matter in sintered granules, composed mainly of cristobalite, a type of silicic acid anhydride, as its main constituent, and small amounts of quarts, tridymite, chlorite, illite, montmorillonite, and the like, having a property of holding microorganisms with ease after microorganisms are adsorbed and adhered thereto, that is, a high supporting capacity because the adsorbents have pores as large as 100 Å in average diameter.

The upper level filter MU and lower level filter MD of the upper deodorization chamber 9 and lower deodorization chamber 10 are caused to carry microorganisms such as activated sludge bacteria, aerobic and photosynthetic bacteria which reduce high load BOD (biochemical oxygen demand).

Next, a description is given of a construction by which neutral replenishing water W1 is replenished into the upper deodorization chamber 9, lower deodorization chamber 10, and lower processing chamber 11 in the deodorization tower 4.

Figure 5:
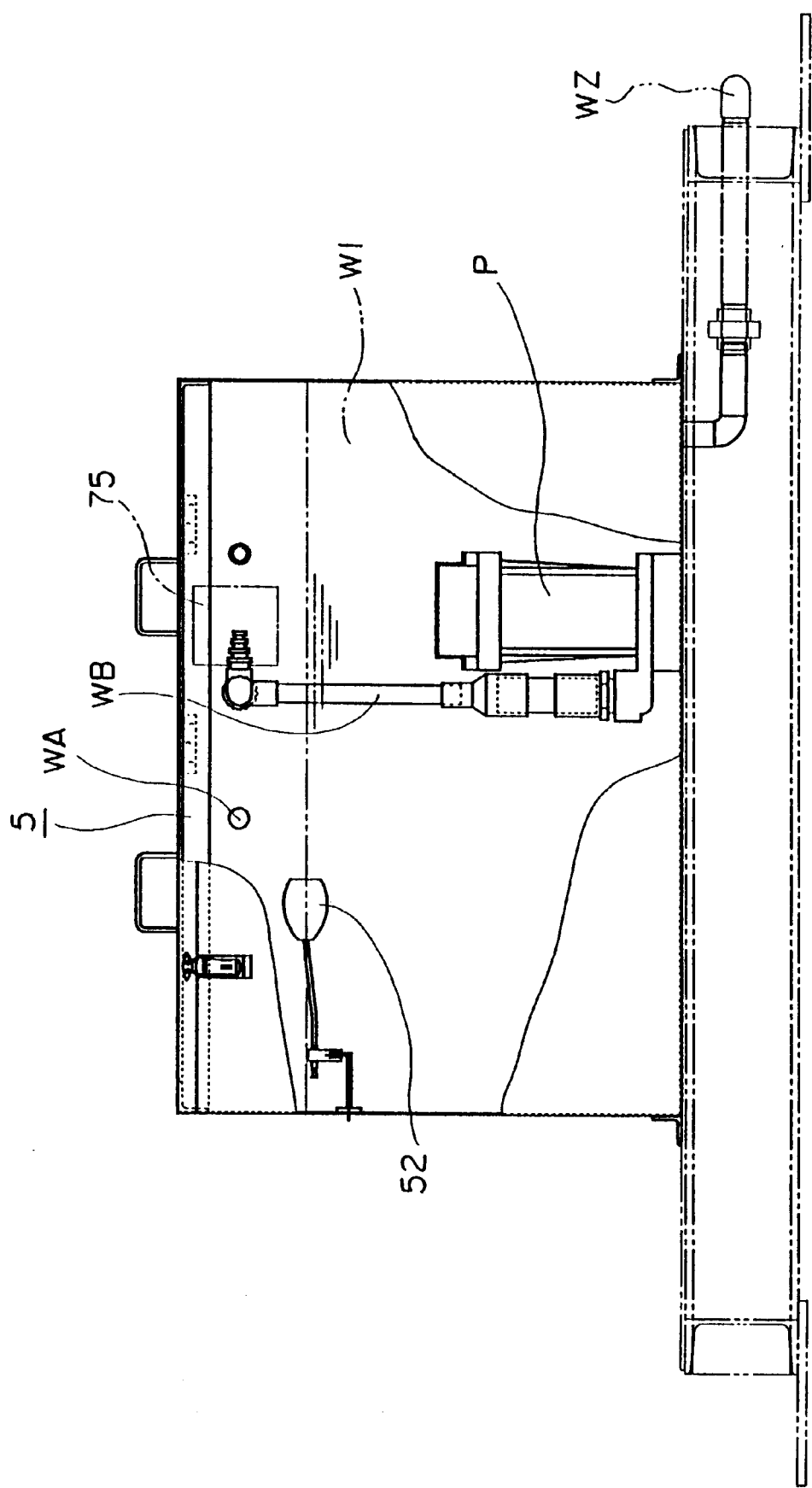
FIG. 5 is a sectional view of a water reservoir.
Figure 6:
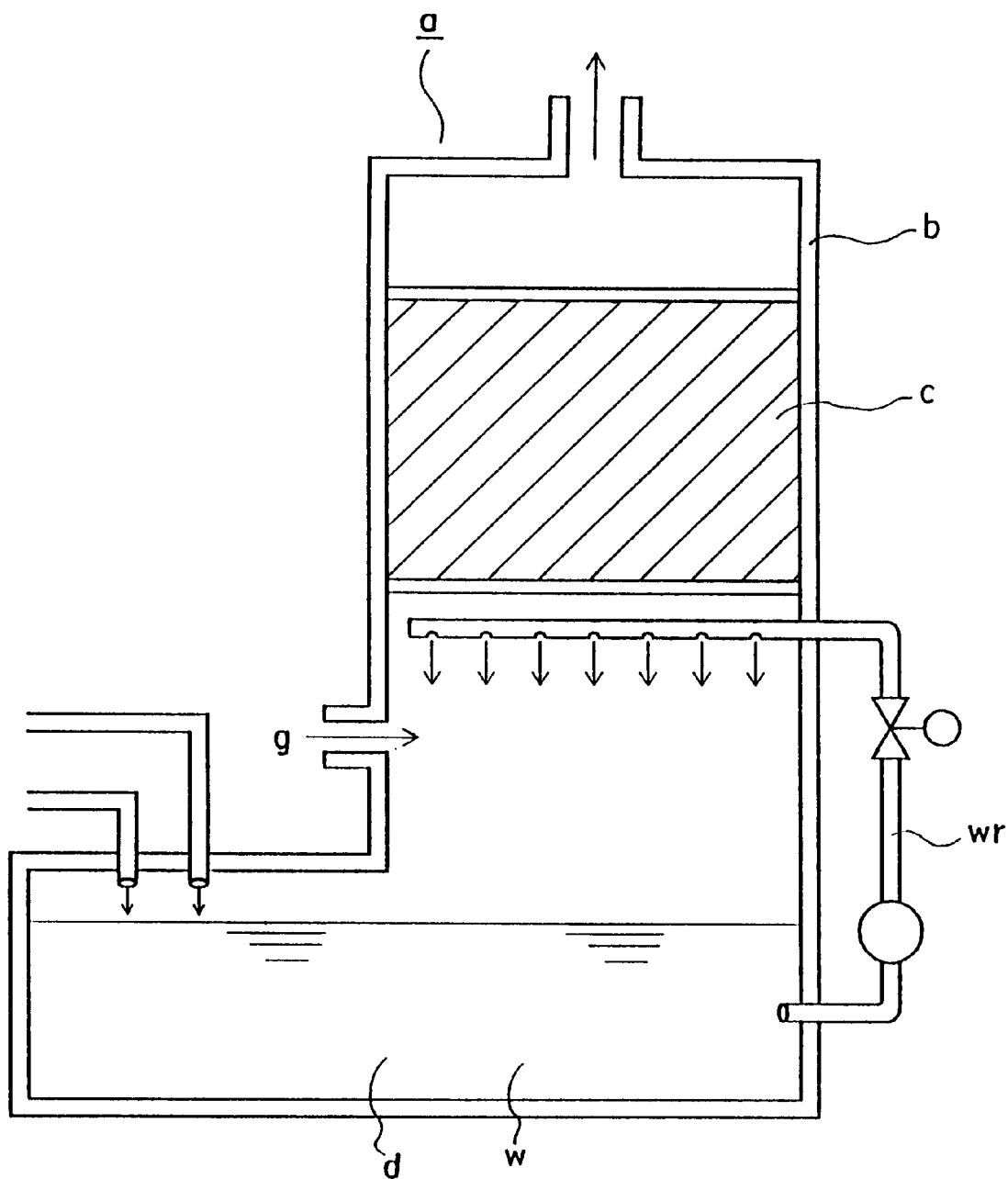
FIG. 6 is a rough sectional view of a conventional deodorizing apparatus.

That is, as shown in FIG. 1 and FIG. 5, a feed water pump P is submerged and provided in the replenishing water W1 stored in the water reservoir tank 5, and is constructed that replenishing water W1 fed by the corresponding feed water pump P is selectively supplied into the upper deodorization chamber 9, lower deodorization chamber 10 and lower processing chamber 11 via a valve box 18, water pressure streaming system WB, water sprinkling systems WUD, WU and WD, and water diluting system WC, etc.

Furthermore, a feed water pipe directly connected to a water pipe of a water supply source PW is connected to the water reservoir tank 5, wherein a feed water system WA is constructed, and at the same time a float switch 52 is provided in the water reservoir tank 5. Thereby, replenishing water W1 is maintained at a required level in the water reservoir tank 5.

And, the abovementioned feed water system WA, water pressure streaming system WB, water diluting system WC, etc., are provided with a required fluid control system at desired places.

First, as for the feed water system WA, an opening and closing valve 72 is caused to intervene in a feed water pipe, a discharge port of the feed water system WA is connected to the water reservoir tank 5, and the opening and closing valve 72 is controlled by the float switch 52.

As for the water pressure streaming system WB, a relief valve 75 is attached at an intermediate position of the water feeding mains connected to the feed water pump P in the water reservoir tank 5, and at the same time the primary side of a three-way change valve 76 having a normally open side and a normally closed side is attached to the downstream end of the feed water mains while the water diluting system WC and water sprinkling system WUD are connected to the two secondary sides of the corresponding change valve 76.

Subsequently, the discharge port of the water diluting system WC is connected to the lower processing chamber 11 while a branching pipe 77 is provided at the downstream end of the water sprinkling system WUD, wherein the branching pipe 77 is divided into an upper water sprinkling system WU to the upper deodorization chamber 9 and a lower water sprinkling system WD to the lower deodorization chamber 10, and is connected to spraying heads 22, 22a, . . . and 28, 28a, . . . of the upper and lower deodorization chambers 9 and 10.

Furthermore, as shown in FIG. 1, as regards the deodorization tower 4 and water reservoir tank 5 of the deodorization system 1, a water discharge system WZ is connected to the water reservoir tank 5 and lower processing chamber 11 in order to discharge replenishing water W1, with various kinds of process water W2D, W2U, and mist WW as discharge water W4 when stopping the operation.

In the respective deodorization chambers, a window may be provided for collecting light, a door may be provided so as to open and close for various operations, and countermeasures may be provided for cold regions so as not to decrease activation of microorganisms, wherein heaters and/or thermistors (thermocouples) may be secured, or heat-shutting materials may be provided, at desired positions in order to prevent replenishing water W1, mixed process water W2, etc., from being frozen.

Next, a description is given of actions of a water supply and drainage type microorganic deodorizing system according to the present invention.

At the initial starting of a deodorizing system 1 according to the invention, microorganisms are inputted into a water reservoir 5, a feed water pump P is started, and replenishing water W1 in which microorgranisms are mixed is sprinkled, as replenishing water W1U and W1D, from the spraying heads 22, 22a, . . . and 28, 28a, . . . into the upper and lower level filters MU and MD via the water pressure streaming system WB, water sprinkling system WUD, upper water sprinkling system WU, and lower water sprinkling system WD.

By such initial operations, microorganisms are adsorbed and adhered to the upper and lower level filters MU and MD, wherein the microorganisms are propagated and carried.

Exhaust gas G which comes from the exhaust gas generating source 2 connected to the exhaust gas inducing ducts 16 and 16a of a deodorization tower 4, whose dust is collected by a dust collector 3, and which is forcibly supplied by a blower 303, is fed into the lower processing chamber 11, wherein the exhaust gas G is caused to ascend from the lower processing chamber 11 by pneumatic pressure provided by the blower 303 of the dust collector 3, is fed into the lower deodorization chamber 10, passing through the lower partition plate 29, and also passes through the lower level filter MD.

In the process of the exhaust gas G passing therethrough, offensive constituents of the exhaust gas G are removed by simultaneous progress of adsorption by the lower level filter MD (adsorbents) and decomposition made by microorganisms carried (adsorbed and adhered to) by the lower level filter MD.

Water soluble offensive constituents having hydrophilic acid groups such as ammonia, amine, hydrogen sulfide, formaldehyde, low-rank organic acids, etc., in the exhaust gas are adsorbed by the lower level filter MD, further dissolved and absorbed by the sprinkled replenishing water W1D contained in the lower level filter MD, wherein the soluble offensive constituents are decomposed and removed by microorganisms.

Then, the exhaust gas G having portions of offensive constituents (water soluble, and non-soluble) removed in the lower deodorization chamber 10 are fed into the upper deodorization chamber 9, passing through the link-ups 13 and 13a secured at the horizontal partition wall 8, and passes through the filled upper level filter MU.

In the process of the exhaust gas G passing therethrough, the remaining offensive odor constituents in the exhaust gas G are removed by simultaneous progress of adsorption made by the upper level filter MU (adsorbents) and decomposition made by microorganisms carried (adsorbed and adhered to) by the upper level filter MU.

Deodorized exhaust gas G with mist thereof removed, when passing through the mist collector of the exhaust ports 7 and 7a, is finally discharged externally through the exhaust ports 7 and 7a.

Furthermore, in a case where a deodorizer storing activated charcoal is connected to the exhaust outlets 7 and 7a, the exhaust gas G from which mist is removed is further deodorized.

Furthermore, operation of adsorbing, decomposing, and removing the offensive odor constituents of the exhaust gas G by the adsorbent (lower level filter MD, and upper level filler MU) and microorganisms in the lower deodorization chamber 10 and upper deodorization chamber 9, is described in detail hereinafter.

First, in the course of the exhaust gas G in a pressurized condition ascending from the lower processing chamber 11 and passing through the lower level filter MD (adsorbent) inside the lower deodorization chamber 10, accompanied by a loss in pressure, the offensive odor constituents of the exhaust gas G are adsorbed by and adhered to pores and the surface of the adsorbent.

Furthermore, since microorganisms are supported by the pores of the lower level filter MD as a result of sprinkling of the replenishing water W1D, the offensive odor constituents adsorbed by the pores of the adsorbent are decomposed by microorganisms.

Subsequently, while the exhaust gas G ascending from the lower processing chamber 11 to the lower deodorization chamber 10, and subjected to primary processing in the lower processing chamber 11 is passing through the upper level filter MU (adsorbent), the offensive odor constituents thereof are adsorbed by and adhered to the pores, surface, and so forth of the adsorbent.

Since microorganisms are carried by the pores, and so forth of the upper level filter MU as a result of sprinkling of the replenishing water W1U, the offensive odor constituents adsorbed by the pores, and so forth of the adsorbent are decomposed by microorganisms.

The processing, applied in the lower deodorization chamber 10 and the upper deodorization chamber 9, respectively, are basically the same, however, there is a difference therebetween, which will be described hereinafter.

The difference between the adsorbent filled in the lower deodorization chamber 10 and same filled in the upper deodorization chamber 9 is that the lower level filter MD of the lower deodorization chamber 10 has a higher adsorptive capacity due to higher porosity thereof while the upper level filter MU of the upper deodorization chamber 9 has a higher decomposition capacity.

The mechanism of deodorization is described in detail hereinafter by comparing further such actions as described in relation to each other.

The offensive odor constituents of the exhaust gas G flowing into the lower deodorization chamber 10 are first adsorbed and held back by the adsorbent having high adsorptive capacity, and subsequently, decomposed by the microorganisms.

Since the upper level filter MU filled in the upper deodorization chamber 9 has lower adsorptive capacity in comparison with the lower level filter MD positioned in the lower deodorization chamber 10, but is composed of a variety of matter, residual offensive odor constituents of the exhaust gas G are adsorbed to pores of the matter, and gaps between the matter, and adhered to the surfaces of the matters, thus being separated from the exhaust gas G and adsorbed to the upper level filter MU.

Further, the upper level filter MU positioned in the upper deodorization chamber 9 has high water holding power and abound as a source of nutrition for microorganisms, enabling bacteria and microorganisms therein to have high reproductivity, and in addition, the upper level filter MU has a higher capacity of decomposing the residual offensive odor constituents (deodorizing capacity) because of a larger number of bacteria existing therein due to a smaller number of bacteria being dropped by the sprinkling of water so that adsorption and decomposition can proceed simultaneously.

Furthermore, the difference in the action of the adsorbent between the lower deodorization chamber 10 and the upper deodorization chamber 9 as described above, has the additional function of cleansing of the adsorbents, described later, besides that of a deodorizing capacity.

The intensity of offensive odor of the exhaust gas G fed from the exhaust gas generation source 2 into the deodorizing system 1 varies because, for example, organic waste dumped into the exhaust gas generation source 2 vary in type from time to time, or a large quantity of organic waste is dumped at a time at intervals.

When the exhaust gas G having an intensely offensive odor is fed into the lower processing chamber 11 of the deodorization tower 4, the exhaust gas G has a stronger odor than at normal times, but the exhaust gas G after ascending into the lower deodorization chamber 10 is adsorbed by the lower level filter MD, and deodorized, reducing the magnitude of an increase in the offensive odor constituents of the exhaust gas G ascending into the upper deodorization chamber 9.

Thus, a temporary increase in the magnitude of offensive odor constituents can be handled by decomposition thereof with microorganisms, bacteria, and the like in the lower deodorization chamber 10 and the upper deodorization chamber 9, and also by the high adsorptive capacity of the lower level filter MD in the lower deodorization chamber 10.

When offensive odor of the exhaust gas G becomes intense with an increase in the offensive odor constituents thereof, there will be a temporary increase in the number of bacteria mainly in the lower deodorization chamber 10 since the offensive odor constituents are sources of nutrition for microorganisms, bacteria, etc., at times of normal operation, and as decomposition of the offensive odor constituents proceeds and the adsorptive capacity is restored, accompanied by a decrease in the offensive odor constituents, a decrease in the number of bacteria takes place later.

The magnitude of an increase or a decrease in the adsorptive capacity, the number of bacteria, and the decomposition capacity of the upper deodorization chamber 9 is relatively small because an increase or a decrease in the offensive odor constituents thereof is mitigated by the action of the lower deodorization chamber 10 intervened between the upper deodorization chamber 9 and the lower deodorization chamber 10.

Now that the purposes and actions of two types of the adsorbents filled in the respective deodorization chambers are brought to light as described above, a further description is given hereinafter of a vertical relation therebetween.

In view of the functions of the respective adsorbents, it is easier to enhance deodorization efficiency by disposing the upper level filter MU finally at the uppermost level (on the downstream side) because the upper level filter MU of the upper deodorization chamber 9 has a higher deodorizing capacity.

The second reason for disposing the upper level filter MU at the uppermost level is because the upper level filter MU is formed by granulating various constituents after bonding the same together with binders, and as the binders are susceptible to the effects of heat, the upper level filter MU is disposed on the downstream side.

That is, since the exhaust gas G is gradually cooled down in the stage of the primary processing applied in the lower deodorization chamber 10, degradation in efficacy of the binders due to the effect of heat does not occur, preventing disintegration of the layer of the upper level MU.

In a case where disintegration of the layer of the upper level filter MU occurs, the water holding capacity of the upper level filter MU containing soil mainly composed of volcanic ash deteriorates due to outflows of the soil, lowering the reproductivity of bacteria.

Furthermore, since bacteria and the like tend to be more activated at lower temperatures, an environment suited for reproduction of bacteria (condition having sources of nutrition) is established in the upper deodorization chamber 9 where the exhaust gas G is cooled to a relatively low temperature in order to maintain and enhance the deodorizing capacity of the deodorizing system 1.

When the processing is applied in the lower deodorization chamber 10, and the upper deodorization chamber 9, respectively, sulfides and a biofilm mainly composed of carcasses of microorganisms are adhered to the surface, pores, and so forth of the adsorbents, deteriorating adsorption and decomposition capacity of the deodorizing system 1, and setting back activation of bacteria due to an acidic atmosphere created by the agency of lower pH caused by the ions of sulfuric acid.

Therefore, neutral replenishing water W1 stored in a water reservoir 5 is periodically sprinkled and sprayed onto the upper level filter MU and lower level filler MD through spraying heads 22, 22a, . . . and 28, 28a, . . . , respectively, secured in the upper deodorization chamber 9 and the lower deodorization chamber 10.

The biofilm is washed off from the upper level filter MU and the lower level filter MD, respectively, by such sprinkling, and pores in clogged conditions are restored to the original condition thereof, enabling the adsorbents to regain adsorptive capacity thereof.

In the course of such washing, a small amount of microorganisms and the like drop, however, an extent to which bacteria drop by sprinkling in the upper deodorization chamber 9 differs from the same in the lower level deodorization chamber 10

More specifically, in the lower deodorization chamber 10, the adsorptive capacity is regenerated through a washing by sprinkling after build-up of the biofilm, but the decomposition capacity is temporarily lowered due to a decrease in the number of bacteria while in the upper deodorization chamber 9, an extent to which the number of bacteria decreased in smaller, thus minimizing the deterioration in the decomposition capacity.

This is yet another reason why two types of the adsorbents are in use for the deodorizing system 1 according to invention.

Water sprinkling has a basic purpose of cleansing the adsorbents and adjusting pH, but it has another purpose in the upper deodorization chamber 9 as follows.

That is, the upper level filter MU abounds in sources of nutrition supply, maintaining an environment suited for propagation of bacteria, and also has water holding capacity. Accordingly, improvement of the environment for microorganisms is achieved by the agency of the upper level filter MU capable of containing and holding water through sprinkling of the replenishing water W1U thereon by operation of the upper sprinkling system WU.

And, a water sprinkling of the adsorbent prevents that reactions of microorganisms regarding deodorization is hindered by accumulation of sulfuric ions, which are generated by a reaction mechanism of activated sludge bacteria in deodorization, and a lowering of pH (acidifying).

Furthermore, since a water sprinkling of the upper level filter MU and lower level filter MD is periodically repeated, sprinkling water (process water W2U and W2D) is dropped through the partition plates 23 and 29, and the upper process water W2U flows into the water processing reservoir 15 via the upper level water receiving portion 27 and discharge system WY1 while the lower process water W2D directly flows therein, the pH is lowered and the process water is acidified.

Still furthermore, since the above process water W2U and W2D flows into and is dropped into the water processing reservoir 15 of the lower processing chamber 11 and mist WW also flows from the dust collector 3 thereinto via the mist streaming WWL, the pH value of the mixed discharge water W3 is lowered, wherein the concentration thereof is accelerated.

Therefore, in order to adjust the concentration and pH of such discharge water W3, neutral replenishing water W1 is replenished from the water diluting system WC linked with the water reservoir 5, wherein the mixed water W2 (discharge water W3) is diluted.

Also, the replenishing water W1 may be always replenished in places other than the upper and lower water sprinkling systems WU and WD, or may be appropriately replenished in compliance with the concentration of the discharge water W3.

And, the discharge water W3, in which the mixed process water W2 is diluted to such a degree as to clear the discharge reference values with replenishing water W1, is discharged through the discharge system WY.

At this time, an inflow port of the discharge pipe in the discharge system WY is established in the discharge water W3, and the intermediate portion of the discharge is disposed at an appointed height, wherein an overflow system is created. Thereby, the water level of the discharge water W3 in the water reservoir 5 is kept higher than a fixed height.

Furthermore, a supplementary description is given of mist WW generated in the dust collector 3.

Since the exhaust gas G fed from the exhaust gas generating source 2 contains water such as steam, the exhaust gas flow is turned from a descending flow to an ascending flow at a time when the exhaust gas G flows into the dust collector 3, wherein mist WW is separated from the exhaust gas G by inertia, and flows into the water processing reservoir 5 via a filter 305, and a mist streaming system WWL.

Species, functions, and so forth of the bacteria, microorganisms and the like which deodorize, are described hereinafter.

In the foregoing description, the photosynthetic bacteria and the activated sludge bacteria are carried in the upper level filter MU and the lower filter MD, and are cited as the microorganisms and bacteria used in the deodorizing system 1. However, when the deodorizing system 1 is in a regular operation, and actions described as follows also take place.

Microorganisms decomposing offensive odor constituents are mainly the photosynthetic bacteria which enables high load operations of BOD, and the activated sludge bacteria which suit an environment in which sludge concentration is lowered. However, depending on the chemical composition of the exhaust gas G, there will occur spontaneous generation of new microorganisms suited for decomposition of such constituents.

Such spontaneous generation of the new microorganisms, being a normal phenomenon occurring in nature, occurs in the deodorizing system 1 according to the invention as well under the same mechanism. The new microorganisms generated spontaneously also contribute to decomposition of offensive odor constituents and deodorization.

As there exist a variety of species of photosynthetic bacteria and activated sludge bacteria, microbial cells found effective by prior analysis of the exhaust gas G are fed into the water reservoir 5 at the start of operation.

In summary, the interior space of the tower 6 is divided into the upper deodorization chamber 9 and the lower deodorization chamber 10 by a horizontal partition plate 8 while link-ups 13 and 13a are made erect through the horizontal partition plate 8, which communicate the upper deodorization chamber 9 with the upper deodorization chamber 10, wherein since exhaust ports 7 and 7a are secured in the upper deodorization chamber 9 and exhaust gas inducing ducts 16 and 16a are provided in the lower deodorization chamber 10, a deodorizing process of exhaust gas G fed from the exhaust gas inducing ducts 16 and 16a into the lower deodorization chamber 10 is carried out in two stages. Therefore, the deodorizing level is further improved, and the exhaust gas G is completely deodorized and is exhausted through the exhaust ports 7 and 7a.

Furthermore, the upper level filter MU having an adsorbing characteristic and having a source of nutrition of microorganisms is filled up upward of the upper deodorization chamber 9, and at the same time, the lower level filter MD having an adsorbing characteristic is filled up upward of the lower deodorization chamber 10, wherein offensive odor constituents of the exhaust gas G can be removed by adsorption of the adsorbents and decomposition by the agency of microorganisms, which proceed simultaneously. Since the offensive odor constituents basically do not accumulate in the adsorbents as a result of actions of replenishing water W1U and W1D, continuous operation is enabled in a longer period of time.

Furthermore, by making deodorization chambers into two stages (upper deodorization chamber 9 and lower deodorization chamber 10) and changing the type of an adsorbent, microorganisms are regenerated well in the upper deodorization chamber 9, and the deodorization capacity is made high, wherein the remaining offensive odors which are not removed by the lower deodorization chamber 10 can be removed. Therefore, the exhaust gas G can be deodorized, and in the lower deodorization chamber 10, it is possible to treat a radical increase in offensive odor constituents by deodorizing them by actions in which adsorption is mainly performed.

Furthermore, since sprinkling heads 22, 22a, . . . and 28, 28a, . . . which spray replenishing water W1U and W1D are, respectively, disposed at the upper part of the upper level filter MU and lower level filter MD, respectively in the upper deodorization chamber 9 and the lower deodorization chamber 10, microorganic film layers and sulfuric ions which are generated by a reaction mechanism taken place when deodorizing in a deodorizing operation are cleansed and removed by the replenishing water W1U and W1D, thereby excluding hindrance factors of microorganic reactions and maintaining a deodorizing capacity. At an initial stage of deodorizing operations, it is possible to regenerate and carry activated sludge bacteria in adsorbents.

Still furthermore, the lower process chamber 11 secured downward of the lower deodorization chamber 10 is made into a water processing reservoir 15, and at the same time the processing water W2U and W2D passed through the upper level filter MU and lower level filter MD are caused to freely flow into the water processing reservoir 15, and further, a water diluting system WC of replenishing water W1Z and a discharge system WY of discharge water W3 are provided in the water processing reservoir 15, wherein since the processing water W2U and W2D used for cleansing the upper level filter MU and lower level filter MD is diluted with replenishing water W1Z in compliance with discharge standards and then discharged, it is possible to prevent the discharge water from being contaminated even though the deodorizing system 1 is operated for a longer period of time.

Furthermore, an upper partition plate 23 having air and water permeable characteristics is provided upward of a horizontal partition wall 8, an upper level filter MU is filled up on the corresponding partition plate 23, the lower deodorization chamber 10 and the lower processing chamber 11 are divided by a lower partition plate 29 having air and water permeable characteristic, a lower level filter MD is filled up on the corresponding partition plate 29, a space above the horizontal partition wall 8 is made into an upper water receiving portion 27 of processing water W2U, and a discharge system WY1 is provided so as to link up the corresponding upper water receiving portion 27 with the water processing reservoir 15, wherein the tower body 6 is sectioned by the horizontal partition wall 8, partition plates 23 and 29 in order to form an upper deodorization chamber 9, a lower deodorization chamber 10, and a lower processing chamber 11. Therefore, the tower body 6 is made cubic, wherein it is possible to easily make the system very compact and to save installation space.

Furthermore, since a dust collector 3 having a blower 303 is caused to intervene between an exhaust gas generating source 2 and a deodorization system 1 when connecting to each other, dust and foreign substance can be prevented from flowing into the deodorization system 1, wherein it is possible to prevent the upper level filter MU and lower level filter MD from being clogged due to dust and foreign substance. Further, since the dust collector 3 has a feature of separating mist WW, in which separated mist WW is caused to freely flow into the water processing reservoir 15 of the deodorization system 1 through a mist streaming system WWL, mist WW of a high concentration is diluted by the water processing reservoir 15, wherein it is possible to prevent discharge water from being contaminated.

Furthermore, a water reservoir 5 is disposed separately from the tower body 6, and since a water feeding means (water feeding system WA) for feeding replenishing water W1 into the corresponding water reservoir 5 and feeding means (water pressure flowing system WB, water diluting system WC, water sprinkling system WUD, and replenishing water W1U and W1D) for feeding replenishing water W1U, W1D and W1Z from the water reservoir 5 to the upper deodorization chamber 9, lower deodorization chamber 10 and lower processing chamber 11 are provided, it is possible to collectively control water feeding to the upper deodorization chamber 9 and lower deodorization chamber 10, and lower processing chamber 11 at the water reservoir 5. Furthermore, since a float switch 52 is provided, which detects the water volume of replenishing water W1 in the water reservoir 5, and the feeding means of replenishing water W1 is operated by the float switch 52 when the water level of replenishing water W1 in the water reservoir 5 is less than a desired water level, it is possible to maintain the replenishing water W1 in the water reservoir 5 at a desired level, wherein even though obstacles such as bleaching powder, etc., with respect to breeding of microorganisms are contained in prime water to be supplied to the water reservoir 5, it is possible to naturally eliminate such bleaching powder by actions of evaporation, etc., while water is stored in the water reservoir 5.

Since a feed water pump P is provided at the water reservoir 5, the water pressure flowing system WB is connected to the corresponding feed water pump P, a water diluting system WC and a sprinkling system WUD are branched from the corresponding water pressure flowing system WB by a change valve 76, and the upper sprinkling system WU and lower sprinkling system WD are connected to the corresponding sprinkling water system WUD, it is enough that only one feed water pump P is prepared as a water feeding means to the upper deodorization chamber 9, lower deodorization chamber 10, and a lower processing chamber 11.

Since a relief valve 75 is provided in the water pressure flowing system WB, pressure is not made excessive in the water pressure flowing system WB, wherein it is possible to prevent the water pressure flowing system WB from being damaged due to pressure by the feed water pump P and prevent the pump P from being hindered.

Since a mist collector is installed inside the exhaust outlets 7 and 7a of the tower body 6, when particles of the process water W2U containing water soluble offensive odor constituents are generated by the spray nozzles 28, 28a, etc., in the upper deodorization chamber 9 and ascend together with the exhaust gas G after being deodorized, mist composed of particles is removed by the mist collector, and only gaseous substances are allowed to pass through, preventing emission of the particles containing water soluble offensive odor constituents into the atmosphere.

With a deodorizer storing activated charcoal therein, linked with the exhaust outlet 7 and 7a, even if the effect of deodorization by the agency of microorganisms, etc., is insufficient, the remaining offensive odor constituents of the exhaust gas G before emission into the atmosphere are adsorbed by the activated charcoal, thereby achieving deodorization.

The outlet of the discharge system WY1 secured at the upper water receiving portion 27 is made open into mixed process water W2 (discharge water W3) in the water processing reservoir 15. Therefore, since the outlet side of the discharge system WY1 is pressurized with discharge water W3 with respect to the pressure inside the upper deodorization chamber 9 and lower deodorization chamber 10 being high, it is possible to prevent reverse flows of the exhaust gas G in the upper deodorization chamber 9 or the lower deodorization chamber 10 toward the lower processing chamber 11 or other unexpected flows thereof.

Furthermore, since the discharge system WY of discharge water W3 in the water processing reservoir 15 is of an overflow system in which water is discharged when the water level of the discharge water 3 exceeds a desired water level, it is possible to drain discharge water W3 in accord with the drainage standards even though mixture of mist WW, process water W2U and W2D is increased or decreased with the discharge water W3 made constant in the water processing reservoir 15.

As the upper level filter MU and lower level filter MD, having an adsorbing capacity, filled in the upper deodorization chamber 9 or the lower deodorization chamber 10, respectively, are composed of porous adsorbents with pores of average diameter not less than about 100 Å, holding capacity thereof for microorganisms can be enhanced in comparison with activated charcoal. Further, as the upper level filter MU filled in the upper deodorization chamber 9, having the sources of nutrition for microorganisms, and an adsorbing capacity, is made by a granulating mixture of porous matter, matter having sources of nutrition for microorganisms, and soil after adding binders thereto, the same is full of gaps between various matter, and contains highly water absorptive matters (soil composed primarily of volcanic ash, and the like), having an excellent adsorbing capacity for microorganisms, and water holding capacity so that a habitable environment suitable for microorganisms can be prepared.

With activated carbon, typical of adsorbents, which is completely carbonized, and has a low water holding capacity because of small pores of average diameter in the range of 10 to 20 Å and low capacity for supporting microorganisms, and lacking in sources of nutrition for microorganisms, it is impossible to achieve sufficient deodorization by the agency of microorganisms having difficulty in attaining spontaneous reproduction.

As the upper level filter MU is produced by granulating a mixture of porous matter made by roasting an organic matter in a covered vessel and soil with the use of binders added thereto, and roasted charcoal produced by the destructive distillation of rice hulls in a covered vessel is used as porous matter made by roasting an organic matter in a covered vessel, matter providing the sources of nutrition for microorganisms combined with porous matters can be secured in large quantities at low cost. The effects are great in actual applications.

What is claimed is:

1. A water supply and drainage type microorganic deodorizing system, comprising:

a tower main body having an interior space sectioned into an upper deodorization chamber and a lower deodorization chamber by a horizontal partition wall;

link-ups vertically provided in the horizontal partition wall, the link-ups linking the upper deodorization chamber with the lower deodorization chamber so that gas to be deodorized flows from said lower deodorization chamber to said upper deodorization chamber;

a deodorized gas outlet provided at the upper deodorization chamber;

an exhaust gas inducing duct provided in the lower deodorization chamber;

an upper level filter having an adsorbing capacity, said upper level filter supplying a source of nutrition for microorganisms and being positioned in the upper deodorization chamber above the horizontal partition wall;

a lower level filter having an adsorbing capacity and being positioned in the lower deodorization chamber below the horizontal partition wall;

spray heads positioned above the upper level filter in the upper deodorization chamber and above the lower level filter in the lower deodorization chamber;

a lower processing chamber secured at a lower part of the lower deodorization chamber including a water processing reservoir with process water sprinkled by the spray heads passing through the upper level filter and the lower level filter, said process water passing through said upper level filter being substantially collected on said horizontal partition wall and said link-ups preventing said process water collected on said horizontal partition wall from flowing onto said lower level filter, said process water passing through said lower level filter and freely flowing into the water processing reservoir;

a water discharge pipe connected to said upper deodorization chamber adjacent said horizontal partition wall and to said water processing reservoir so as to drain said process water collected on said horizontal partition wall to said water processing reservoir;

a process water diluting system which supplies fresh water to the water processing reservoir; and a discharge system which discharges water from the water processing reservoir.

2. A water supply and drainage type microorganic deodorizing system as set forth in claim 1, wherein the discharge system is an overflow system by which discharge water is discharged when the water level in the water processing reservoir exceeds a desired water level.

3. A water supply and drainage type microorganic deodorizing system as set forth in claim 1, wherein the upper level filter and the lower level filter each are made porous and have an average pore diameter which is at least approximately 100 Å.

4. The water supply and drainage type microorganic deodorizing system according to claim 1, wherein said link-ups are tubular and extend upwardly into said upper deodorizing chamber above said water discharge pipe so that water flows out said water discharge pipe before the water flows through said link-ups onto said lower level filter.

5. A water supply and drainage type microorganic deodorizing system, comprising:

a tower main body having an interior space sectioned into an upper deodorization chamber and a lower deodorization chamber by a horizontal partition wall;

link-ups which link the upper deodorization chamber with the lower deodorization chamber and are vertically provided at the horizontal partition wall;

an exhaust gas inlet provided in the lower deodorization chamber;

an exhaust gas outlet provided in the upper deodorization chamber;

an upper partition plate having air and water permeable characteristics provided above the horizontal partition wall;

an upper level filter positioned in the upper deodorization chamber on said upper partition plate, the upper level filter having an adsorbing capacity and supplying a source of nutrition for microorganisms;

a lower partition plate having air and water permeable characteristics positioned in the lower deodorization chamber;

a lower level filter positioned in the lower deodorization chamber on said lower partition plate, the lower level filter having an adsorbing capacity;

a spray head positioned above said upper level filter to sprinkle replenishing water thereon, and a spray head positioned above said lower level filter to sprinkle replenishing water thereon;

a lower processing chamber positioned below said lower partition plate, said lower processing chamber including a water processing reservoir with process water provided by the spray heads falling through the upper and lower level filters and freely flowing into the water processing reservoir;

a space above the horizontal partition wall defining an upper process water receiving portion;

a water diluting system which supplies replenishing water to the water processing reservoir; and a discharge system linking said upper process water receiving portion with said water processing reservoir.

6. A water supply and drainage type microorganic deodorizing system as set forth in claim 5, wherein said exhaust gas inlet includes:

a dust collector having a blower between an exhaust gas generating source and said lower deodorizing chamber, the dust collector having a deodorizing system which mists water on the exhaust gas and a mist separator for separating the mist from the exhaust gas, and a connection connecting the dust collector to the water processing reservoir for causing the separated mist to freely flow into the water processing reservoir.

7. A water supply and drainage type microorganic deodorizing system as set forth in claim 5, wherein said water reservoir is provided separately from the tower main body; and said system further includes a water movement system having means for feeding replenishing water into said water reservoir, means for supplying replenishing water from the water reservoir to the upper deodorization chamber, the lower deodorization chamber and lower processing chamber, and a float switch which detects the water volume of replenishing water in the water reservoir, wherein the water feeding means for replenishing water is actuated by the float switch when the water level in the water reservoir is less than a desired water level.

8. A water supply and drainage type microorganic deodorizing system as set forth in claim 7, wherein said water movement system includes a sprinkling water system, a feed water pump in the water reservoir and a water pressure flowing system connected to the feed water pump, said water pressure flowing system is branched to said water diluting system and said sprinkling water system by a switch valve, and said sprinkling water system being connected to said spray heads.

9. A water supply and drainage type microorganic deodorizing system as set forth in claim 8, wherein said water pressure flowing system includes a relief valve.

10. A water supply and drainage type microorganic deodorizing system as set forth in claim 5, wherein said exhaust gas outlet includes internally thereof a mist collector.

11. A water supply and drainage type microorganic deodorizing system as set forth in claim 10, wherein said exhaust gas outlet includes a deodorizer storing activated charcoal.

12. A water supply and drainage type microorganic deodorizing system as set forth in claim 5, wherein an outlet of said discharge system secured at the upper water receiving portion opens into the water processing reservoir.

13. A water supply and drainage type microorganic deodorizing system as set forth in claim 5, wherein the upper level filter is porous and has an adhesive agent which granulates and solidifies soil.

14. A water supply and drainage type microorganic deodorizing system as set forth in claim 13, wherein the upper level filter is a substance made porous by baking an organic substance.

15. A water supply and drainage type microorganic deodorizing system as set forth in claim 14, wherein the substance of the upper level filter is roasted charcoal produced by baking rice hulls.

16. The water supply and drainage type microorganic deodorizing system according to claim 5, wherein said water processing reservoir includes a water pump connecting said water processing reservoir to said spray heads.

* * * * *